(No Model.)
T. H. HICKS.
ARMATURE FOR DYNAMO ELECTRIC MACHINES AND METHOD OF MAKING SAME.
No. 528,204. Patented Oct. 30, 1894.
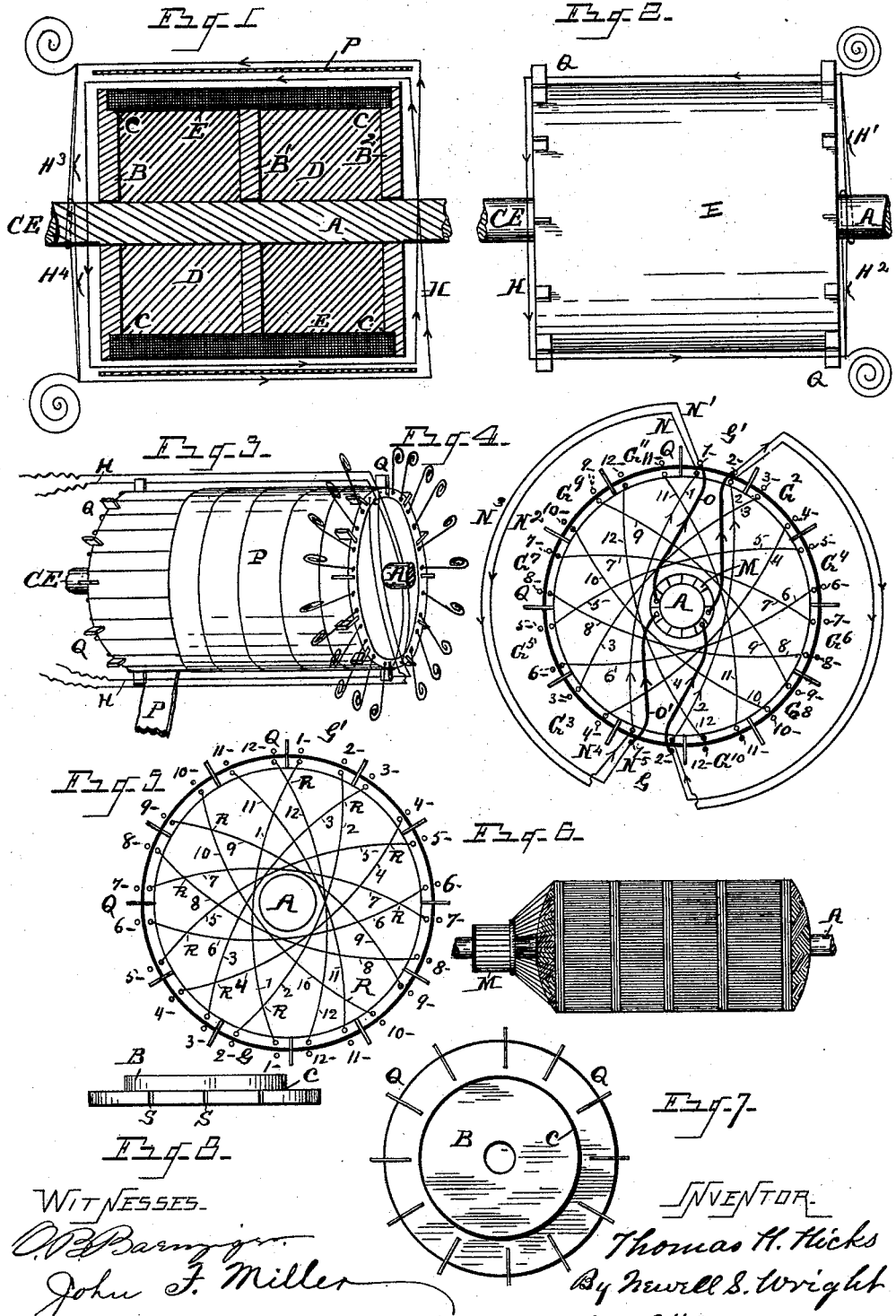
WITNESSES
O. B. Barny jr.
John F. Miller
INVENTOR
Thomas H. Hicks
By Newell S. Wright
His Attorney.

UNITED STATES PATENT OFFICE.

THOMAS H. HICKS, OF DETROIT, MICHIGAN.

ARMATURE FOR DYNAMO-ELECTRIC MACHINES AND METHOD OF MAKING SAME.

SPECIFICATION forming part of Letters Patent No. 528,204, dated October 30, 1894.

Application filed July 14, 1893. Serial No. 480,471. (No model.)

*To all whom it may concern:*

Be it known that I, THOMAS H. HICKS, a subject of the Queen of Great Britain, residing at Detroit, county of Wayne, State of Michigan, have invented a certain new and useful Improvement in the Manner of Constructing Armatures for Dynamo-Electric Machines and Electric Motors; and I declare the following to be a full, clear, and exact description of the invention, such as will enable others skilled in the art to which it appertains to make and use the same, reference being had to the accompanying drawings, which form a part of this specification.

This invention relates to new and useful improvements in the construction of armatures for dynamo electric machines and electric motors, and has for its objects: first, a novel construction of the magnetic core of the armature, and, second, the system and manner of winding the conductors on the magnetic core, and the manner of insulating between the layers of conductors surrounding the armature core.

To these ends my invention consists of the devices and appliances, their construction, combination and arrangement, as hereinafter described and claimed, and illustrated in the accompanying drawings, in which—

Figure 1 is a longitudinal section, showing the internal construction of the armature core, and a diagram view of one complete two-layer bobbin of the armature conductor with the insulation between the layers also in longitudinal section. Fig. 2 is an elevation of the same, showing the bobbin referred to in Fig. 1 as being only partly completed in its winding. Fig. 3 is a perspective view, showing further details of the armature windings and my method of insulating between the layers of said windings. Figs. 4 and 5 are diagrammatic views of the front or commutator end of the armature, showing modification in winding. Fig. 6 is a plan view, showing the general appearance of the armature when finished. Fig. 7 is a view of the inner end of the flanges B and $B^2$, shown in Fig. 1. Fig. 8 is an edge view of the same.

The general appearance of the completed armature is not unlike what is commonly known as the "drum" or "Siemens" armature; but a careful examination of the specific construction of my armature will clearly reveal novel and important improvements in cheapness, lightness, and safety against being burned out.

I will first describe the construction of the armature core. This I show in all of its detail in Figs. 1, 7 and 8, which I will explain as follows:

A is the armature shaft, having three metallic heads or flanges, marked B, B', $B^2$, secured upon the shaft at proper distances from each other. I prefer making these flanges of cast-iron, and shrinking them upon the shaft, after which they can be turned off in a lathe, to bring them into proper shape. At the inner edges of the periphery of the flanges B and $B^2$ I cut away or reduce their diameters so as to form square shoulders, which I show at "$c$," "$c$," "$c$," "$c$," Figs. 1, 7 and 8. The diameter of the inner or shouldered portion of the flanges B, $B^2$, I make the same as the diameter of the center flange B'. I next fill the space between the flanges with plaster of paris, or its equivalent, which I show at D D. The plaster of paris is next turned off to the diameter of the head or flange B', and even with the shoulders "$c$." In this way I form a spool of the plaster and flanges which is very solid and true to the shaft. I next wind a cylinder of iron wire upon the plaster of paris and shouldered edges of the flanges. This cylinder is shown in Fig. 1 in section and is marked E. I prefer the wire to be either rusted or covered with cotton and each layer being shellacked, after which it is dried in an oven, or in any other suitable manner, and thus it forms a very solid, substantial, light, cheap and highly inductive core. When making small armatures of this type, I can omit the center flange B', the iron wire cylinder having sufficient support where it rests on the shoulders "$c$" of the flanges B and $B^2$. When the iron wire is wound upon plaster of paris alone, the former becomes loosened from the plaster, by shrinkage, in time. The plaster, of course, is only used for a foundation to wind the wire E upon. After the iron wire is dried, the plaster might be removed, if desired. I have only mentioned plaster of paris for a temporary foundation to wind the iron wire upon, but any suitable material, such as sulphur, water lime, Portland cement, or even resin, might be used; but plaster of paris is the most practical.

When winding the iron wire upon the armature spool, care, of course, must be observed against hammering the wire down too tightly at the flanges B and $B^2$ lest the shaft should become sprung.

The core of the armature thus constructed, is next covered with cotton or linen, in the ordinary way, and pins Q, see Fig. 7, for example, are then inserted around the edges of flanges B and $B^2$ in the slots, shown in Fig. 8, marked S, thus dividing the periphery of the armature core into the desired number of sections, for winding in the armature bobbins.

I wish it to be understood that the essential features in constructing a magnetic core thus described, lie in forming two or more metallic supports for the iron wire core and securing said supports to the shaft, so as to rotate therewith.

I will now proceed to describe the method of winding the armature conductors, so as to consist of two layers, having the terminal ends of each armature bobbin upon the periphery of the armature, and the layers independently insulated from each other. These special and distinguishing features I produce in the following manner: Each pair of diametrically opposite sections of the armature I wind with two separate conductors, and each of said conductors I call a bobbin, so that each pair of said armature sections contains two bobbins. It has been customary heretofore to wind these bobbins over diametrically opposite portions of the armature, thus causing each pair of bobbins to cross each other on the ends of the armature. This I avoided by one system of my winding as shown in Fig. 4, and by so doing I obtain a more symmetrical winding on the ends of the armature, and also the ends of the armature build out very much less. Every cross that is avoided on the end causes the latter to build out one wire less. This is important.

Two methods of winding each section of the armature with two bobbins, I show in Figs. 4 and 5. Fig. 4 illustrates my improved method of crossing the ends of the armature core, and Fig. 5 the common method, shown herewith in order to more clearly understand my invention; but I will refer to this feature of the winding later on.

Let us look first at Fig. 2, which shows one bobbin partly wound according to my improved method. C E on the shaft A indicate the commutator end of the armature. The other end of the armature I will designate as the "rear" end. H is a conductor, and forms one bobbin when complete, as shown in Fig. 1. In Fig. 2 I show it only partly wound. In winding a bobbin I begin at the rear end of the armature and tie the wire to the shaft, as shown, by a cord $H'$. The wire is then laid along the top of the armature, over the commutator end, and then along the opposite side to the rear end and then secured to the shaft by a cord $H^2$. The center of the conductor should be at the C E end of the shaft. I next wind another bobbin, in a similar manner, by the side of this one, in the same armature sections, so that the two bobbins will be in parallel with each other throughout their circuit. Each section of the armature thus far completed I show in Fig. 3, which represents an armature divided by pins Q into twelve sections. In winding the sections, I prefer to wind every alternate one, thus winding one and skipping one, until the sections are all filled with one layer, as shown in Fig. 3. The sections being thus wound with one layer I next hammer this layer down until the conductors are all smooth and straight and then bind this layer down with insulating tape, as shown in Fig. 3, marked P, the end of the tape being shown in said figure as broken off. I next begin with the first bobbin laid, and cross the rear end of the armature, in opposite directions, with the terminals of the bobbin, deflecting the wire back over the first portion of this bobbin and then securing the terminals which are all among the outer layer of the bobbins to the shaft at the C E end of the armature by cords $H^3$, $H^4$, as shown in Fig. 1. The circuit of this bobbin I show by arrow heads on the conductor H, in Fig. 1, and the insulation between the two layers I show in section, marked P, in same figure. The two bobbins of the first section thus complete I show in Fig. 3. They are marked H. The remaining sections in this figure I have left uncompleted, so as to expose the insulating tape P, and to show more clearly how the outer layer of each bobbin is left until the inner layer of each bobbin is laid in place and insulated circumferentially around the armature. The coiled ends of the conductors, it will be understood, are intended to be of sufficient length to accomplish the required winding. It will be understood, of course, that the outer and inner layers of each bobbin are composed of the same conductor. When the armature is complete, it will appear as shown in Figs. 4 and 5. I will now explain more fully the two methods of winding a section with two bobbins. These two figures show the armature divided by pins Q into twelve sections and each section containing two bobbins. There is a difference, however, as stated before, in the winding shown in the two figures, which may be seen at a glance.

Fig. 4 exhibits what I call "parallel" windings, that is to say, two bobbins are wound side by side without crossing each other, as may be seen by reference to sections G and $G'$, Fig. 4. I show the two bobbin windings in these sections complete, in diagram, which may be traced as follows: N and $N'$ indicate respectively the inner and outer conductors shown above in Fig. 1; $N^2$, $N^3$ the rear end conductors, and $N^4$, $N^5$ the two under conductors. The outer or terminal ends, marked O and O', are secured to two sections of the commutator M. Shown in Fig. 4. The other bobbin of this section, left unmarked by letters, is in all respects wound similar to the one just described. The relative positions of the two, however, differ, the one described being wound on the left side of the shaft A, and the other wound on the right side. It may be seen, then, that although the two bobbins are wound in diametrically opposite sections of the armature, neither one is wound over diametrically opposite portions of the armature. Therefore, by the term "parallel" bobbin winding, I mean the method shown in Fig. 4, as described. The remaining bobbins in sections $G^2$, $G^3$, $G^4$, $G^5$, $G^6$, $G^7$, $G^8$, $G^9$ and $G^{10}$, $G^{11}$, are each wound in a similar manner to the bobbins G, G'. The terminal ends of these bobbins are not shown carried to the commutator, but cut off, to prevent confusion. The terminal ends, which are cut off, are marked by figures having a dash after them: 1— 2— 3— 4—, &c. The conductor of each bobbin is marked by figures of like character, except the terminal ends, which have the dash referred to. The inner and outer layers of conductors are shown to be separated from each other by the circle of insulating tape, marked P.

It will be noticed that in Fig. 4, each pair of bobbins crosses the ends of the armature in a symmetrical and similar manner; but in Fig. 5, which is not what I call a "parallel" winding, the symmetry is not preserved. In each section, shown in Fig. 5, the two bobbins cross each other at R at one side of the ends of the armature. This latter winding is more apt to unbalance the armature mechanically; as symmetry cannot be so easily preserved in all of the sections when the bobbins are wound to diametrically opposite portions of the armature, in this system of winding where the terminal ends of the bobbins are all external to the armature.

In Fig. 5 I have shown all of the terminal ends of the bobbins to be cut off, the position of the conductors on the end of the armature being sufficient to indicate the style of winding. As in Fig. 4, I indicate the conductors of each bobbin by figures of like character, the terminal ends by a dash, located by the side of the figures 1, 2, 3, &c.

I desire it to be understood that although I have only shown each bobbin to consist of a single conductor, still, each bobbin may consist of a group of conductors, and still come within the range of my intention. In such a case my meaning of the term "layer" would then include the number of multiple conductors forming the circuit of a bobbin, and the band of insulation P would then be wound over said layer of multiple, or groups of conductors. The distinguishing feature, therefore, in my present system of winding the core of an armature, is, to wind, hammer down, straighten and then bind down the under layer of all of the bobbins before the outer layer of the same bobbins is wound. In this way, I have a securely and solidly formed insulating foundation to wind the outer layer of the bobbins upon, and also, I have the two layers of windings composed of only one set of bobbins, and the terminals of the bobbins all proceeding from the outer layer. In winding an armature in this way I avoid all danger of short-circuiting the inner and outer layers of coils with each other when hammering the layers down upon the armature core; for short-circuiting the two layers is very apt to occur when the armature is wound with a large conductor and the under layer has to be hammered down through the outer layer, as is the common practice, and not only this, but, when straightening of the two layers is left until both of them are wound, the loose conductors will under such circumstances, be crowded to the ends of the armature, with such pressure, that, within a short period after use, the armature is likely to become short-circuited and therefore burn out. My present method of winding prevents all such dangers.

In winding an armature in accordance with my present plan, it will be noticed that, when winding the first layer, the terminal ends of each bobbin are tied to the shaft, at the rear end of the armature, until all of the first layer has been completed. In this way, after the first layer is bound down by the insulation P, the conductors which are to form the outer layer, are all securely held in place by the band P even after the cords H have all been cut and removed from the shaft. The coiled ends of the bobbins at the rear end of the armature, in Fig. 3, illustrate an armature thus far wound, and in addition thereto, shows also four of said coiled ends carried to opposite sides of the armature core, in pairs, terminating at the C E end of the armature. The ends, after being carried to the C E or commutator end of the armature in this way, are again tied to the shaft by cord, as in Fig. 1. When these coiled ends are all carried to the C E end of the armature, in this way, the outer layer may then be said to be completed, and after their terminals are connected to the commutator, and the outer layer bound down by bands of wire in the ordinary way, I then have an armature which would appear as in Fig. 6.

My invention, therefore, discloses a new method of winding the conductors upon the armature core; the method consisting of forming bobbins of two divisions of coils; having an encircling band of insulation between the two divisions; and having only one set of terminal ends for the two divisional layers of the bobbins; and all of these ends arranged in the outer layer of conductors.

I do not claim to be the first discoverer of a method of simply winding an armature with two layers of conductors with insulation between the layers; for, I am fully aware that such a method is old and well known by others, but I wish to call attention to the fact that the old method shows the terminal ends of the two divisions of the bobbins to be arranged in two layers, one layer of terminals being on top of the other. It may, therefore, be seen that this old method does not disclose a method of forming each bobbin of two divisions and having only two terminals for the two divisions with the encircling insulation between them.

I am also aware that armatures have heretofore been wound so as to consist of two layers, having only one set of external ends for the two layers, but, in this case the two layers of one bobbin were wound before the first layer of the second bobbin, and therefore, the under layer required to be hammered down through the outer, and the encircling insulation between the two layers could not therefore be used. The only way, therefore, that the encircling insulation can be applied between the two layers of the same bobbins in the manner I claim to be my invention, is viz., to wind one half of each bobbin first, and, after applying the insulation as specified, then finish the outer half of the bobbins; thus having all the terminal ends of the bobbins arranged in the external layer of the armature. There is a very important distinction between forming each bobbin of two independent parts, each part having its own terminals, and forming each bobbin of two parts with the outer portion only having terminals, and the encircling insulation between the two parts; for, herein lies my discovery.

What I claim as my invention is—

1. The herein described and illustrated method of winding an armature core with conductor-bobbins, consisting of winding each bobbin with two layers of coils formed of the same conductor and arranging the terminals of each bobbin in the outer layer of coils; the under layer of all of the bobbins being wound before winding any of the outer layer, substantially as illustrated and described.

2. The herein described and illustrated method of winding and straightening the bobbins of an armature core, having each bobbin formed of the same conductor, wound of two layers of coils and having only one set of terminals for the two layers of each bobbin, and the terminals all proceeding from the outer layer of coils; said method consisting of winding the under layer of all of the bobbins before winding any of the outer layer, then straightening the under layer, and finally winding the outer layer over the under layer, in the manner substantially as described.

3. The herein described and illustrated method of winding, straightening and insulating the bobbins of an armature core, having each bobbin formed of the same conductor, and wound of two layers of coils and having only one set of terminals for the two layers of each bobbin, and the terminals all proceeding from the outer layer of coils; said method consisting of winding the under layer of all the bobbins before winding any of the outer layer, then straightening the under layer of coils and applying a circular binding band of insulation, and finally winding the outer layer of the bobbins over said insulation, substantially as described.

4. The herein described and illustrated method of winding an armature core with conductor-bobbins, having two layers of coils in each bobbin, and each bobbin formed of two conductors; said method consisting of dividing the armature into sections, winding each section with two conductors coiled in parallel, having the terminals of each conductor arranged in the outer layer of coils, the first layer of all of the bobbins being first wound, the second layer being then wound upon the first layer, substantially as described.

5. In an electric machine, a "drum-armature" divided into sections; each section containing two bobbins of armature conductors; each pair of bobbins wound by the side of and parallel to each other; the terminals of all of the bobbins being located in the outer layer of coils of said bobbins, substantially as described.

6. In an electric machine, a "drum-armature" having bobbins of conductors composed of two layers of coils; the layers of coils being separated from each other by an encircling band of insulation; the terminals of all of the bobbins being located in the outer layer of coils, substantially as described.

7. In an electric machine, a "drum-armature," the conductor-bobbins of which are composed of pairs of bobbins, each pair being wound by the side of and in parallel to each other; each bobbin being composed of two layers of coils; the two layers of coils having an encircling band of insulation between them; all of the terminals of the conductor-bobbins being located in the outer layer of coils, substantially as described.

8. In an electric machine, an armature having its conductor-bobbins each composed of two divisions, with an encircling band of insulation between said divisions, and the terminals of all the bobbins proceeding from the outer layer of the bobbins, substantially as described.

9. In an electric machine, an armature having its core composed of flanges B, B' and B², secured to the shaft A; and having non-conducting material D between said flanges; and a cylinder E, of iron wire wound upon said flanges and non-conducting material D, substantially as described.

10. In an electric machine, an armature having flanges shrunk upon the shaft of the armature, so as to be secured thereto; non-conducting material D located between said flanges; a cylinder E composed of insulated iron wire, wound upon the non-conducting material D; said flanges having slots for pins Q around their peripheral edges, substantially as described.

11. In an electric machine, an armature core composed of flanges B, B', B², non-conducting material D, and iron wire cylinder E; the core thus formed having bobbins of conductors wound upon said core; each bobbin composed of two layers of coils, and the terminals of all of the bobbins proceeding from the outer layer of said coils, substantially as described.

In testimony whereof I sign this specification in the presence of two witnesses.

THOMAS H. HICKS.

Witnesses:
 N. S. WRIGHT,
 JOHN F. MILLER.